United States Patent [19]
Staver

[11] Patent Number: 5,917,640
[45] Date of Patent: Jun. 29, 1999

[54] ROTATABLE POLYGONAL MIRROR UNIT HAVING ADJUSTABLE MIRRORS

[75] Inventor: Arild Staver, Slependen, Norway

[73] Assignee: Cargoscan A/S, Oslo, Norway

[21] Appl. No.: 08/927,803

[22] Filed: Sep. 12, 1997

Related U.S. Application Data

[62] Division of application No. 08/545,801, filed as application No. PCT/NO94/00090, May 13, 1994, Pat. No. 5,742,068.

[30] Foreign Application Priority Data

May 13, 1993 [NO] Norway .................................... 931741

[51] Int. Cl.⁶ .................................................. G02B 26/08
[52] U.S. Cl. ........................... 359/216; 359/198; 359/855; 359/865
[58] Field of Search ........................... 359/198, 216–219, 359/850, 855, 865, 871, 872

[56] References Cited

U.S. PATENT DOCUMENTS

| | | |
|---|---|---|
| 3,529,884 | 9/1970 | Ives et al. . |
| 4,684,252 | 8/1987 | Makiguchi et al. . |
| 4,692,629 | 9/1987 | Nakamura . |
| 4,996,440 | 2/1991 | Nordbryhn . |
| 5,005,928 | 4/1991 | Suzuki et al. . |
| 5,687,017 | 11/1997 | Katoh et al. .............................. 359/216 |

FOREIGN PATENT DOCUMENTS

| | | |
|---|---|---|
| 0 346 015 | 12/1989 | European Pat. Off. . |
| 0 503 167 | 9/1992 | European Pat. Off. . |
| 38 19 058 | 12/1989 | Germany . |
| 87/05766 | 9/1987 | WIPO . |

*Primary Examiner*—James Phan
*Attorney, Agent, or Firm*—Browdy and Neimark

[57] ABSTRACT

An apparatus (5) for measuring the dimensions of an object (1) where a measuring carriage (6) moves the object at a distance thereabove. A polygonal mirror unit (32) receives laser light (16) and reflects it in a fan-shaped form toward a stationary angled mirror unit (37,38) which directs the light towards a double-curved stationary mirror unit (39) which reflects the beam onto the object. Mirrors (40) of the polygonal unit are adjustable.

4 Claims, 13 Drawing Sheets

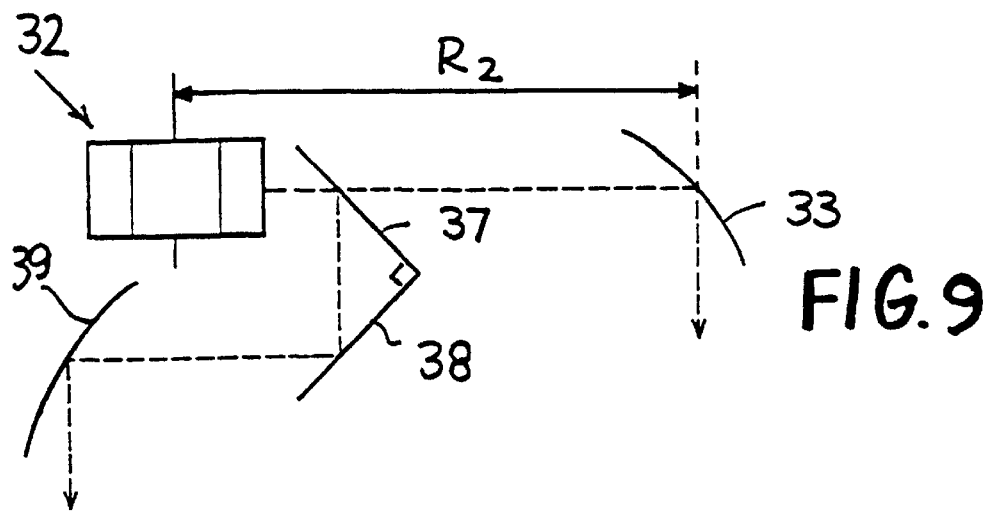
FIG. 9
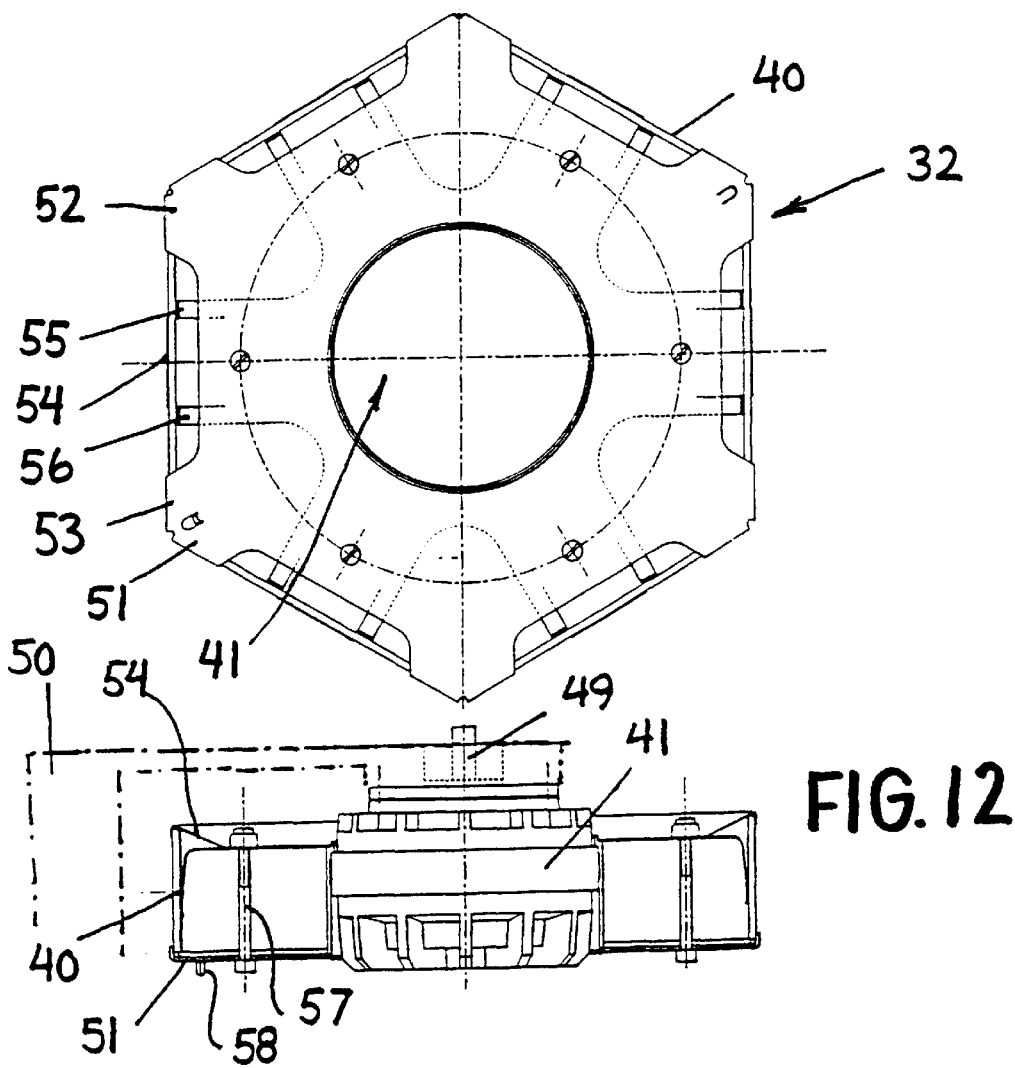
FIG. 11
FIG. 12

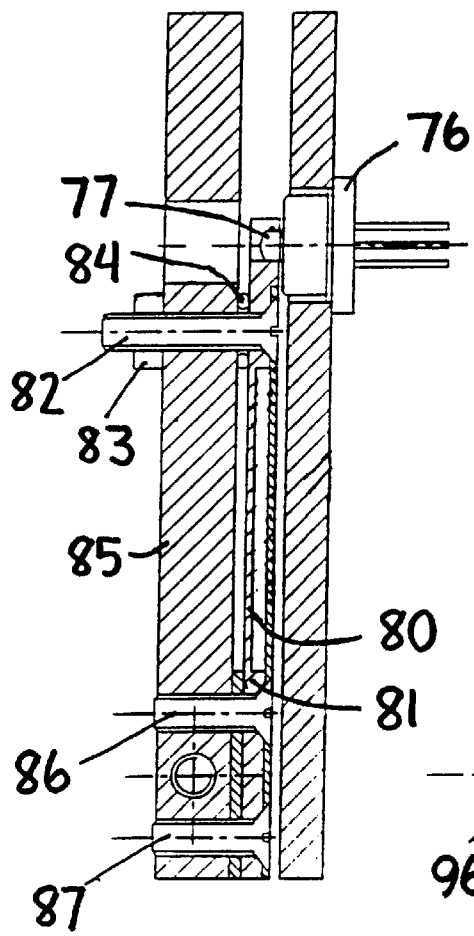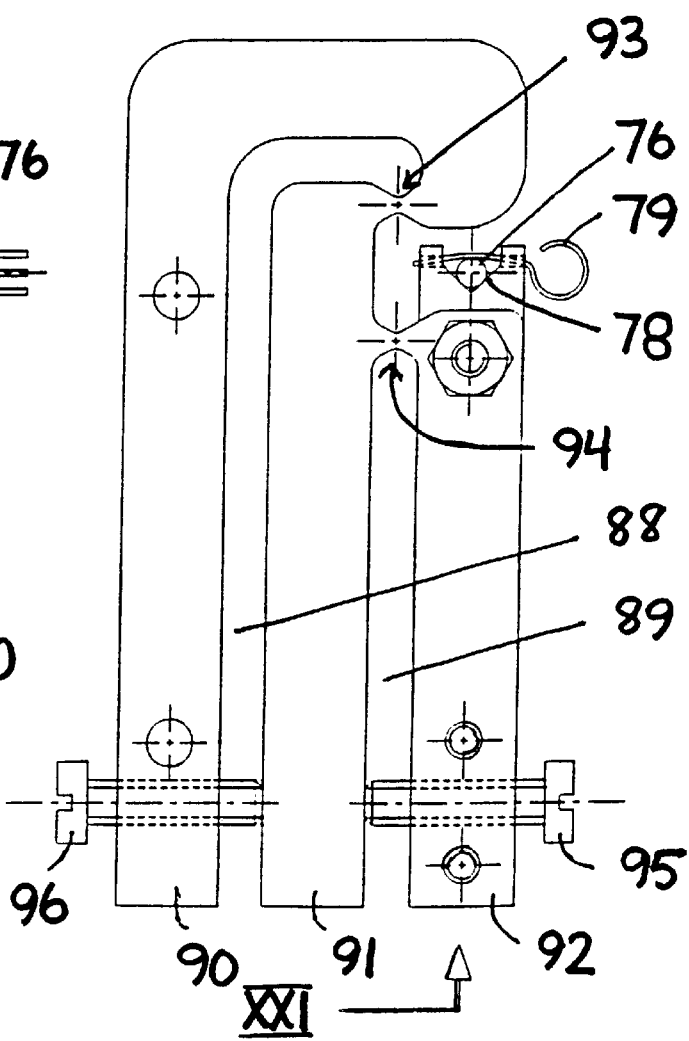

ROTATABLE POLYGONAL MIRROR UNIT HAVING ADJUSTABLE MIRRORS

CROSS-REFERENCE TO RELATED APPLICATION

This is a division of PCT/NO94/00090, filed on May 13, 1994, which was nationalized as U.S. application Ser. No. 08/545,801 on Nov. 8, 1995, U.S. Pat. No. 5,742,068.

The present invention relates to an apparatus for measuring the distance to one or more areas of an object in order to determine one or more dimensions of said object, comprising means for directing a light beam towards the object, means for registering the light beams that are reflected from the object, means for calculating the time it takes for the beams to travel to and from the object, and means causing the light beam to sweep over the object perpendicular in relation to a fixed reference plane during the entire sweeping operation, and with relative movement between the apparatus and the object to be measured, the light that is reflected by the object being transmitted back to the light registration means via said light beam sweeping means, and said light beam sweeping means including a stationary mirror which is arced in its longitudinal direction, and also means, e.g. a rotatable mirror, which causes the light beam to move over the stationary mirror.

PROBLEMS OF THE RELATED TECHNOLOGY AND OBJECTS OF THE INVENTION

An apparatus of this kind is known from U.S. Pat. No. 4,996,440. This known solution includes a pitch in the scanning arc which corresponds to the radius of curvature of the stationary mirror. This means that the measuring apparatus must move over an unduly long distance which corresponds to the length of the object plus twice the length of said radius of curvature.

It is therefore an objective of the present invention to reduce the radius of curvature and thereby make the measuring apparatus as compact as possible.

In the known solutions, it is intended that the distance be measured from the measuring apparatus and down towards the underlying support along parallel, vertical light paths. However, it is not always easy to obtain such vertical and parallel paths of measurement. This makes great demands on the measuring optics. With the present invention, it is thus intended to obtain parallel paths of measurement of this kind, and also to ensure that it is possible to continuously calibrate the distance measuring apparatus while in operation.

One objective of measuring by means of parallel, vertical lines is, inter alia, that the position of the point of measurement will not be dependent upon the vertical distance of movement of the light. In addition, it is desirable that a reflecting component in the surface of the object will at one point at least, namely the highest point, reflect the light back to the measuring apparatus. Furthermore, a principal objective of the present invention is to avoid fields of shadow.

One of the known problems with distance reading apparatus is to be able to shield a light detector in such a way that one prevents or compensates for unwanted reflected rays or so-called scattered light in such a way that light of this kind does not reach the detector. The present invention provides a solution which enables this problem to be overcome.

Moreover, to be able to finely adjust the position and/or focus of a lens unit of a diode laser in a simple way is known to be a problem. The present invention aims also to provide a means to enable this to be accomplished.

BRIEF DESCRIPTION OF THE DRAWING

The characteristic features of the invention will become apparent in the patent claims hereinbelow and also in the specification with reference to the enclosed drawings.

FIGS. 6, 7, 8, 9 and 10 show in perspective view, in side view, plan view, side view and from above, respectively, details of the measuring principle according to the invention.

FIGS. 11 and 12 illustrate in detail a polygonal mirror unit seen from below and in partial section, respectively.

FIG. 20 is a front view of a first embodiment of an apparatus for finely adjusting position and/or focus of the lens unit of a diode laser.

FIG. 21 shows the section XXI—XXI in FIG. 20.

DETAILED DESCRIPTION OF THE PREFERRED EMBODIMENT

Figure 1:
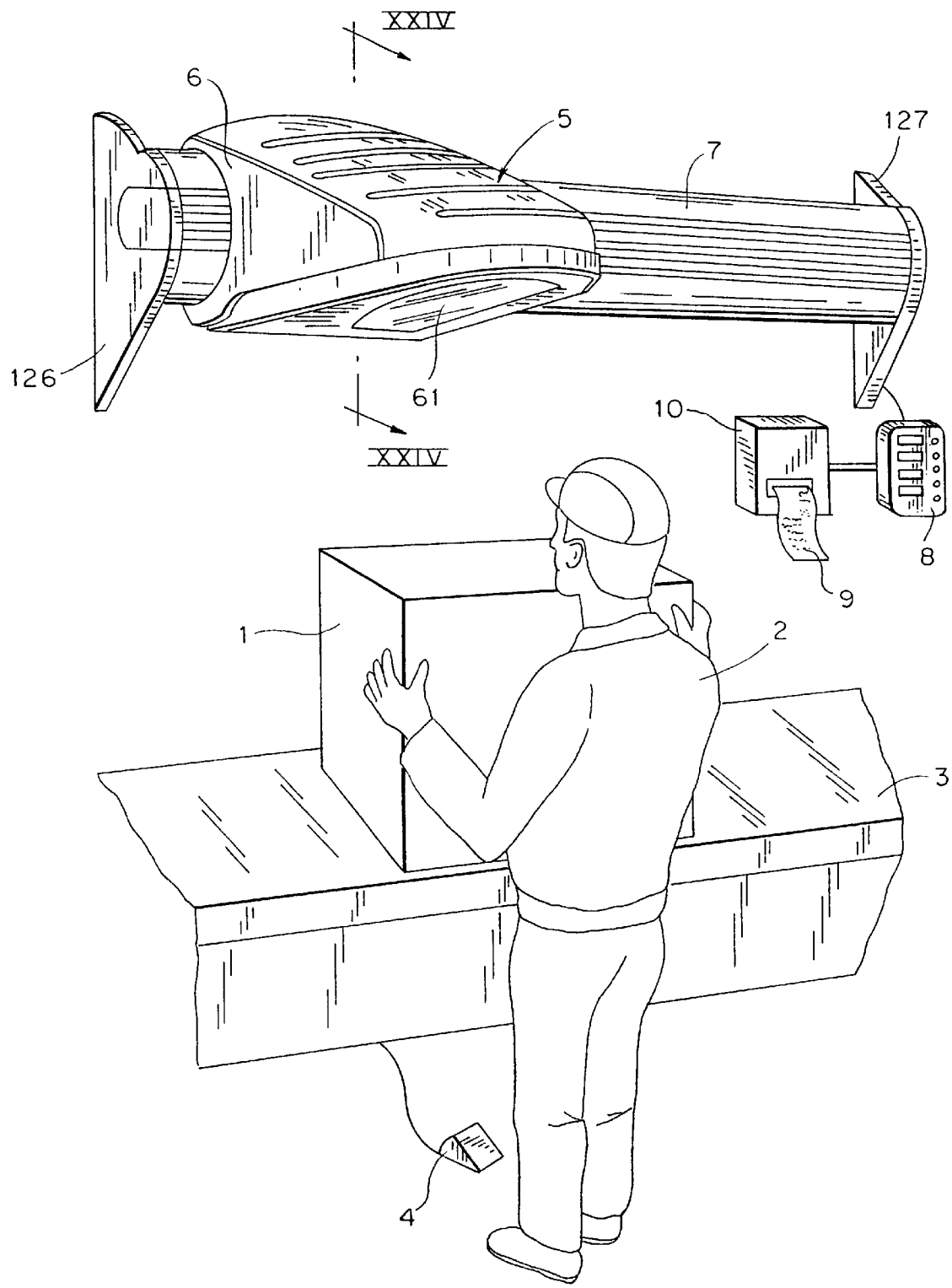
FIG. 1 illustrates one use of the invention in a typical working situation.

The physical object 1 which is to be measured is placed by means of an operator 2 on a table 3, a weighing scale or another stable, invariable surface. The measuring apparatus, in FIG. 1 indicated in general by means of the reference numeral 5, is advised that a measurement is required by means of a start signal given via a push button, foot pedal 4, or a command across a serial interface from an external computer (not shown). The measuring apparatus 5 is in a measuring carriage 6, and said measuring carriage 6 is made to move over the object 1 along a guiding profile 7, whereby the dimensions of the object are read. A short time after the carriage 6 has passed over the object 1, the measured dimensions and/or parts thereof, e.g., the volume of the object, will be shown on a display 8. The result of the measurement may optionally also be fed to said commuter. A print-out 9 may optionally also be provided via a printer 10. This print-out can, for instance, be in alphanumeric form or in the form of bar code, or optionally in the form of both. The print-out may optionally be of a kind such that it can be adhered to the object, so that the dimensions of the object are thus unambiguously defined in connection with possible later handling of the object.

After an output and/or print-out has been given the measuring apparatus will be ready to measure a new object.

Figure 2:
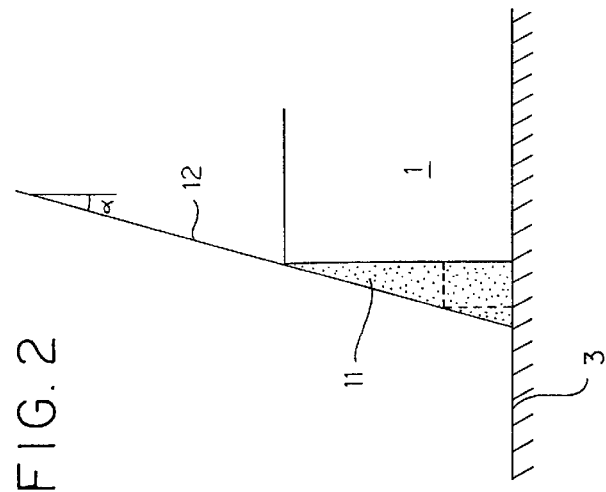
FIG. 2 illustrates the problems linked with "fields of shadow".

FIG. 2 is related to problems of so-called "fields of shadow". In the application of volume measuring for allocating tariffs for freight services, the regulations are drawn up in such a way that payment has to be made for the smallest right-angled rectangular box or crate in which the object can be placed. If the path of measurement or the path of the light beam deviates from 90° towards the underlying support 3, a field of shadow 11 will occur, as illustrated in FIG. 2. The measuring apparatus will be unable to detect the content of said field of shadow. The angle that the scanning light beam 12 forms with the vertical, the angle $\alpha$, should thus be as close to 0° as possible. The maximum error of measurement will depend upon how much there may be within a shadow area of this kind and that cannot be detected. As an example, let us assume that one has a package that is of a height equal to 700 mm and a specified accuracy of measurement of the measuring apparatus that is equal to 5 mm. With a solution of this kind the angle $\alpha$ must deviate with <5/700 rad, equal to approx. 7.6 milliradians. If one wishes to take into consideration deviations which may go each in their own direction on either side of the package, the angle must be <3.5 milliradians.

Figure 3:
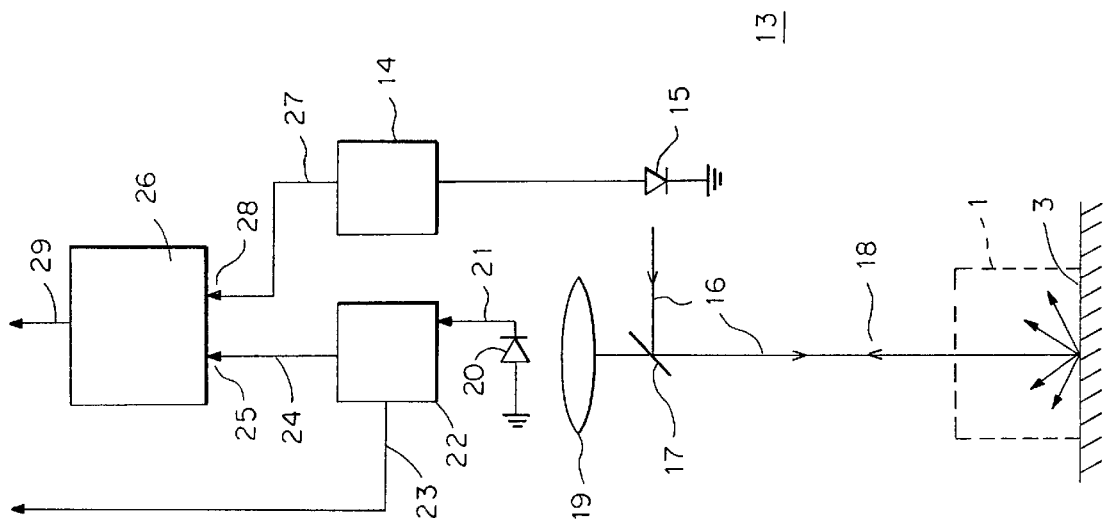
FIG. 3 illustrates the measuring principle of a laser distance reader.

FIG. 3 shows the measuring principle for a laser distance reader, generally denoted by the reference numeral 13. An oscillator 14 modulates a laser diode 15 with an FM frequency (e.g. 82 MHz). The laser light which is emitted from the laser diode 15 is denoted by reference numeral 16 and passes via a mirror unit 17 downwards at right angles towards the underlying support 3 on which an object may be placed. Light reflected back is marked with the reference numeral 18 and travels past the mirror unit 17 via optics 19 to an optical sensor 20, e.g. a photodiode which is capable of registering the received laser light. This received light signal is transferred via a connection 21 to an amplifier 22 which has automatic gain control (AGC). A signal is produced at the first outlet 23 from said amplifier which is characteristic of the received luminous intensity. A second outlet 24 from the amplifier 22 is connected to a first input 25 on a phase measuring device 26, and an outlet 27 on the oscillator 14 is connected to a second input 28 on the chase measuring device 26. The distance measuring apparatus will measure the distance to the object 1 by measuring the time T1 that the light takes from when the laser beam leaves the distance measuring apparatus, hits the object 1, and is received as reflected light by the sensor 20. This time is measured by measuring, in the phase measuring device 26, the phase difference between the emitted light, as registered at the input 28, and the light reflected back, as registered at the input 25 of the phase measuring device 26. Characteristic distance values are then produced at the output of the phase measuring device 29.

Figure 4A:
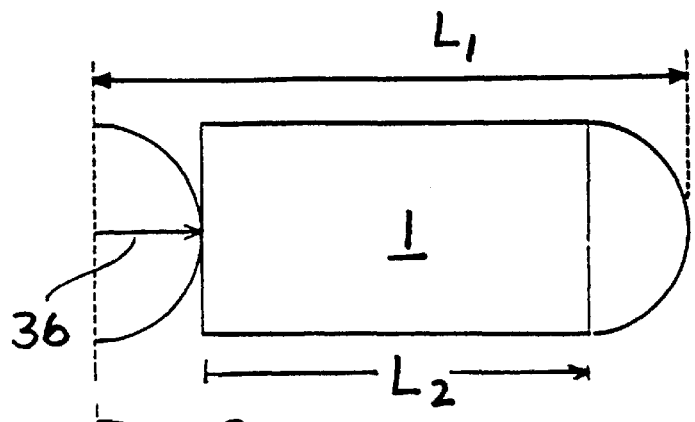
FIGS. 4A and 4B show the pitch and gauge length in connection with the prior art, e.g., as disclosed in U.S. Pat. No. 4,996,440.

U.S. Pat. No. 4,996,440 makes known the use of a cone segment mirror surface to deflect the scanning beam to scan at right angles downwards to the underlying support. With a solution of this kind, as indicated in FIGS. 4A and 4B, the necessary gauge length for the measuring carriage will have the value L1 which is equal to twice the radius R1 of the conical mirror 30, as shown in FIG. 4B and also the length L2 of the object as shown in FIG. 4A.

Figure 4B:
Figure 5A:
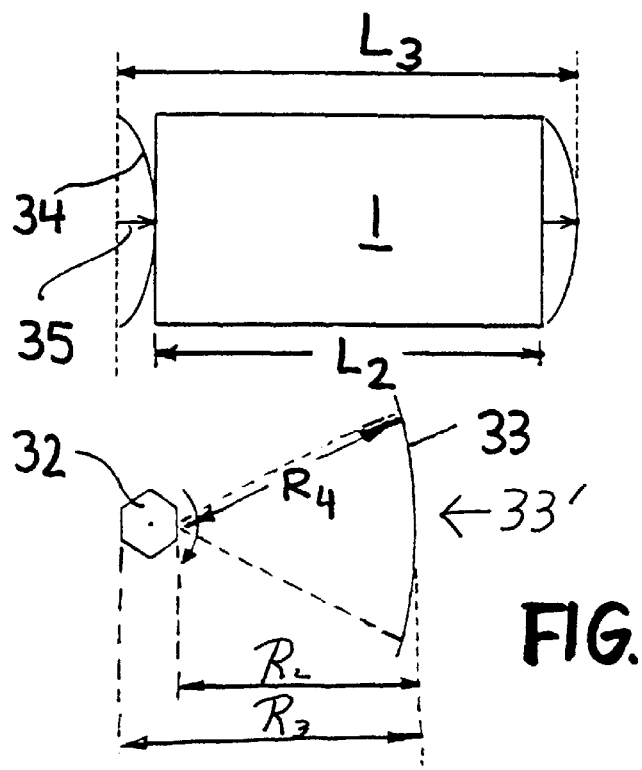
FIGS. 5A and 5B show the pitch of the scanning arc and the gauge length, according to the invention.
Figure 5B:

In the present invention, as is made apparent in FIGS. 5A and 5B, instead of the rotating plane mirror 31 in FIG. 4B, a polygonal mirror unit 32 is used. The mirror unit 32 is, in the preferred embodiment, made of six mirror surfaces arranged on the six sides of the polygon. According to the present invention, instead of the conical mirror 30, a modified paraboloid is used, i.e., a double curved mirror or a parabola, the arc of which having a radius curvature with a radius which is modified somewhat over the length of the mirror and being greatest at the ends of the mirror. In FIG. 5B, the modified paraboloid mirror is marked with the reference numeral 33. Here $R_3$ denotes the length of the measuring carriage which is increased relative to the known $R_1$ value. $R_2$ is the distance between the center of the mirror surfaces of the polygonal mirror unit 32 and the mid-point of the double curved mirror 33, as is seen in the drawing. $R_4$ denotes the radius of curvature of the mirror 33. However, it should be pointed out that $R_2$ will change gradually as the mirror 32 rotates and that this is compensated by the design of the double curved mirror 33.

Figure 13:
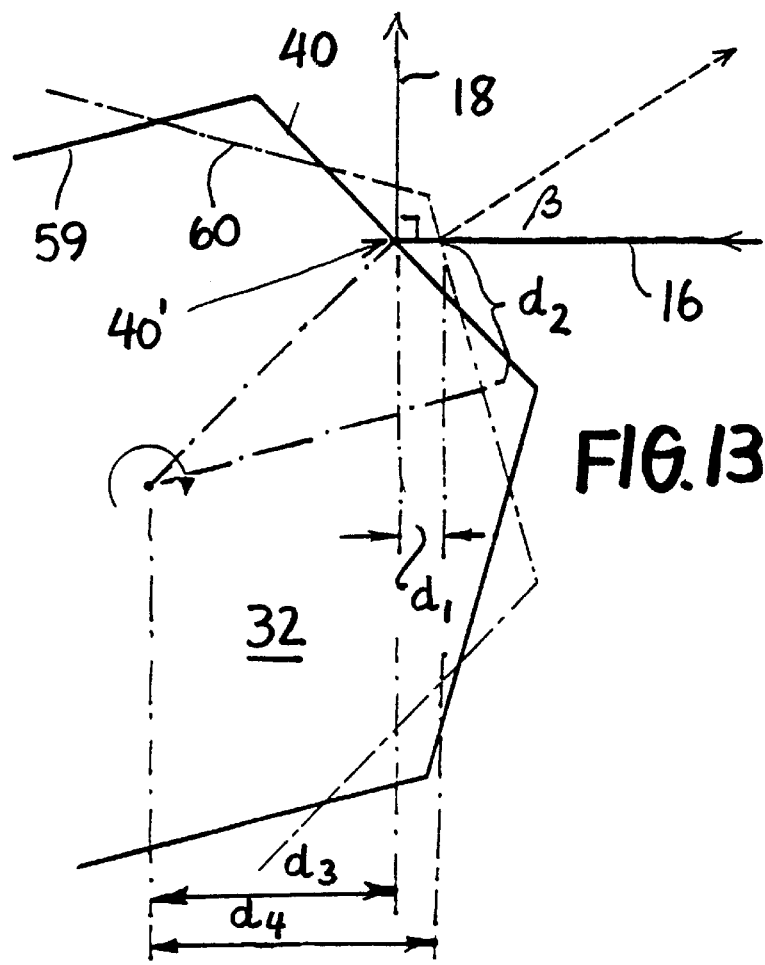
FIG. 13 shows the deflection of laser light by means of the mirror unit.

It is sideways component $d_1$, in particular, that is the problem when using the polygonal mirror, see FIG. 13. The shifting $d_2$ of the foot point along the mirror surface does not, however, cause such great problems. To compensate for said shifting $d_1$ in particular, $R_4$ will be greater at the ends of the mirror 33 than at the midpoint 33'. Thus, at said ends in particular $R_4 > R_2$, see FIG. 5B. Furthermore, the pitch 35 of the scanning path 34 will be considerably smaller, Preferably approx. 15–30% of the radius of curvature or the pitch 36 which is made possible according to the solution shown in FIG. 4A, but on the other hand the length of measuring carriage increases.

However, this means that the effective measuring length that the measuring carriage must move will be equal to L3, which is twice the pitch 35 plus the length L2 of the object 1. The measuring length will be related to effective scanning time over the object.

As will be seen from FIGS. 4A and 4B, the conical mirror 30 spans over an angle which is almost equal to 180°. One problem with a solution of this kind is that said pitch 36 of this arc will be large. With the solution according to the invention, one achieves a reduction in the length of the apparatus or guiding rail 7 when the pitch 35 is reduced. The scanning angle for the fan-shaped scan will thus also be smaller. This in turn means that it is possible to use a plurality of mirror surfaces in the polygon and rotate said polygon at a lower speed of rotation for the same scanning frequency as is used in the known solution according to FIG. 4. The most substantial disadvantage with the solution which is outlined in FIG. 5 is that the length of the measuring carriage in the direction of movement will be greater owing to the increased radius between the polygonal mirror unit and the double curved mirror 33.

As will be described in more detail in connection with FIGS. 6 to 10, the present invention aims to make the dimensions of the measuring carriage as small as possible.

Figure 6:
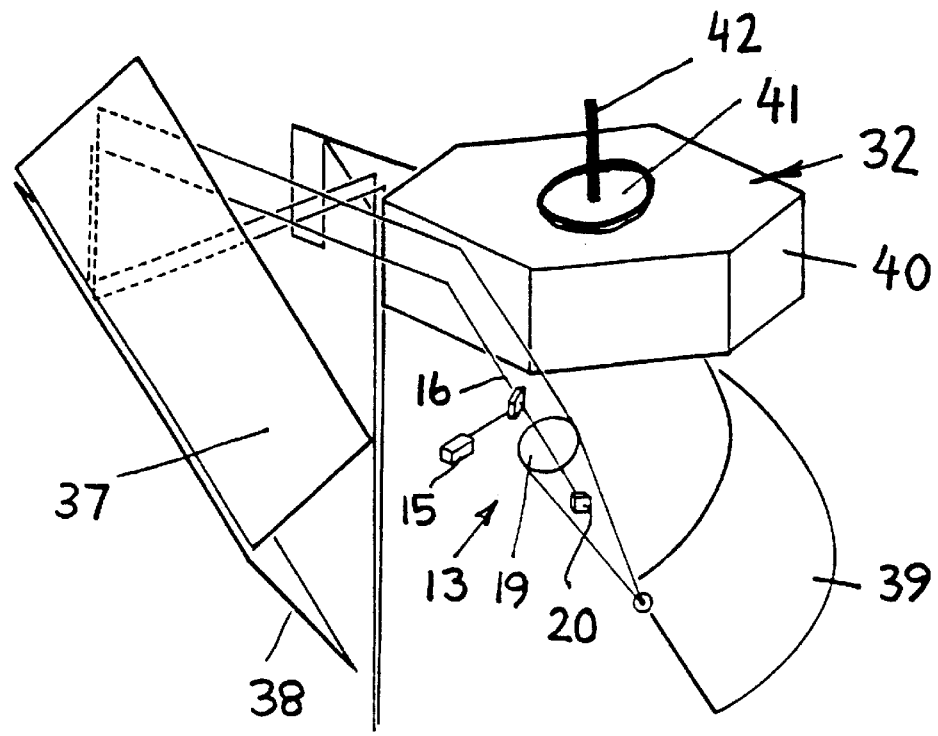
Figure 7:
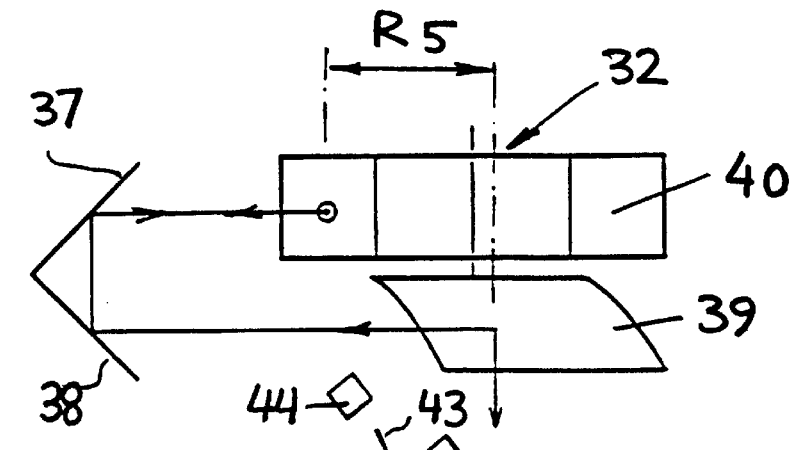
Figure 8:
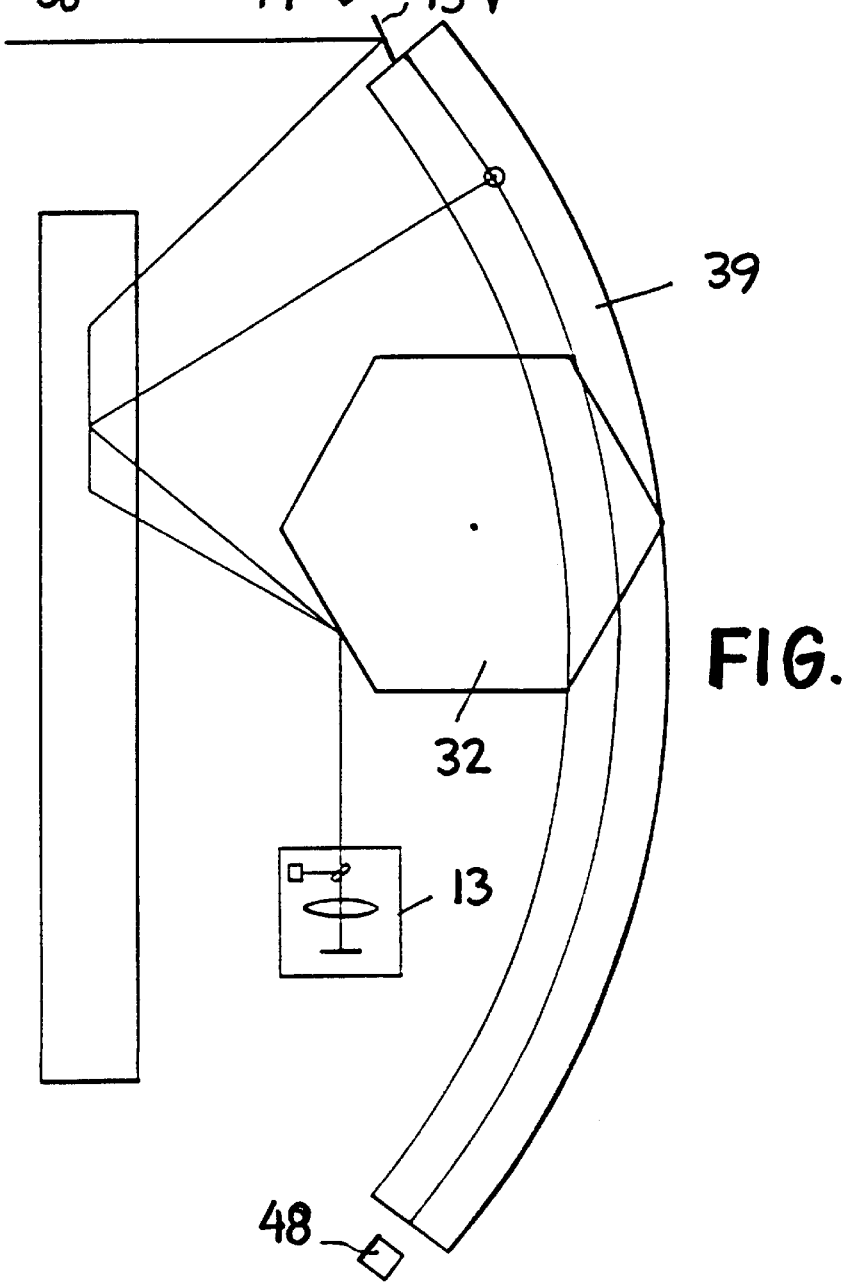

Before FIGS. 6 to 8 are described in more detail, a brief reference will be made to FIG. 9. In the solution illustrated therein, the distance between the centre of the mirror surfaces of the polygonal mirror unit and the mid-point of the double curved mirror 33 is equal to $R_2$ as shown in FIG. 5B. The length of the measuring carriage will, however, be considerably reduced in that the scanning beam, which spreads out in a fan shape, will be folded 90° twice by means of two mirrors 37 and 38 which form an angle of 90° in relation to one another, said light beam being reflected from the mirror unit 32 towards the mirror 37, thence to the mirror 38, and on further to a double curved mirror 39 so that, in the example shown in FIG. 7, the distance between a centre of the mirror surface of the polygonal mirror unit and the mid-point of the double curved mirror 39 has a distance $R_5$. In this way one achieves a considerable reduction of the total dimensions of the apparatus. In addition to giving rise to a more compact measuring carriage, which is somewhat at the expense of the height of the carriage, this solution groups the optics in two sets of mirror surfaces which are mounted directly above/below to one another. As long as an even number of mirror surfaces are closely connected to one another at fixed angles in relation to one another, a rotation or translation of the two connected mirrors, which together form one system, will be of no consequence for the angle at which the light leaves the mirrors taken as a whole. Thus, the two folding mirrors 37 and 38 are connected to one another in one system and the polygonal mirror unit 32 and the double curved mirror 39 are connected together in a second system within the present apparatus.

The laser distance measuring device 13 will, by means of its laser, emit a light beam 16 in the direction of the mirror 17, whence the light beam 16 is reflected in the direction of the rotating polygonal mirror unit 32. This unit has, for instance, six mirror surfaces 40 mounted on the side surfaces of the polygon. Each mirror has been given a size that has been determined by the aperture of the receiving optical means 19. The laser light will be dispersed in a fan shape from the polygonal mirror unit 32 as this rotates. This fan-shaped light will be folded in said mirrors 37 and 38 which are mounted at 90° relative to one another. The scanning light beam or laser light fan will thus hit a large double curved deflecting mirror 39. This mirror will deflect the received light beam 90° so that the light scans at right angles downwards to the underlying support 3 which is found under the measuring apparatus. This light that has been reflected from the object will be, as explained earlier, detected and the phase difference between the emitted laser light and the received laser light will, as previously mentioned, form the basis for calculating successive distances to the object 1 which is on the support 3.

As will be understood immediately, the light which is reflected from the object will be led via the double curved mirror 39 to the lower folding mirror 38, thence to the upper folding mirror 37, thence to the polygonal mirror unit 32, and thence via the optical means 19 to the detector 20.

As will be understood from FIG. 6, the polygonal mirror unit 32 will be driven by a motor 41, where the mirror unit constitutes a part of the motor rotor, and where the motor central stator is via a suspension or shaft 42 rigidly connected to a framework or other mounting means in the measuring carriage.

A laser distance measuring apparatus, such as the one described and illustrated here, will be capable of being exposed to a certain drift in the measurement values over time, for example because of temperature changes, aging, variation between models, etc. It will therefore be both desirable and necessary to calibrate the distance measuring apparatus whilst it is in operation. For this purpose it is proposed, according to the invention, to provide a mirror 43 at the end of the double curved mirror 39, i.e. between a trigger diode and the mirror 39. The light will be deflected here so as to pass through a window 45 (seen in FIG. 10) and hit an end 46 of the guide rail or guide profile 7. A small plate 47 which has been given a grey toned pattern is positioned at the end 46 and from here measurements are taken during each scan. When the carriage 6 moves along the rail 7 the position of the carriage is measured by means of a pulse generator on the drive motor of the carriage. This pulse generator operates a counter circuit which will be zero set at the end position of the rail. Thus, from this counter absolute information is obtained with regard to the position of the carriage and this is used for calibrating the distance measuring apparatus. The grey toned pattern on the plate will provide measurements of different luminous intensity.

Figure 10:
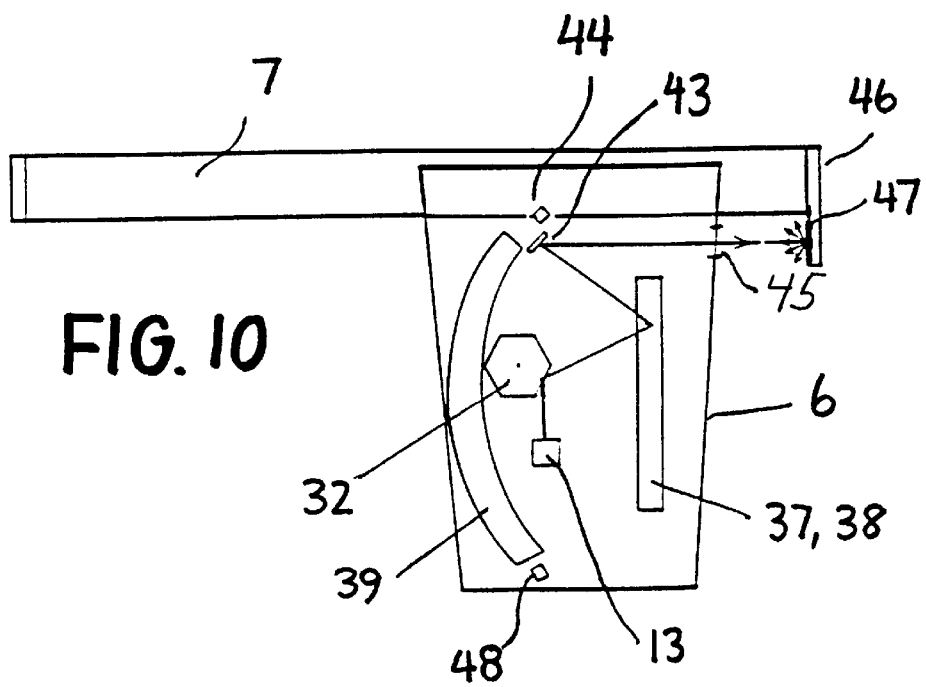

Said trigger diode 44 and also 48, as shown in FIGS. 8 and 10, will emit a signal when the light beam meets said diodes, where starting and stopping of a scan will be indicated. This will also give a fairly reliable determination of the momentary position of the light beam along the double curved mirror 39 when the speed of the motor 41 is known or is constant, so that it can be measured exactly by means of the trigger diodes.

In the present invention, a polygonal mirror unit 32 is used, the task of which being to spread out the laser beam and to pick up the light spread towards the receiver in a fan shape, as previously described, so that the object to be measured is scanned in one axial direction. However, it is considerably difficult to construct a polygonal mirror unit of this kind with precision sufficient to ensure that the path of light which is generated by each of the six mirrors (in the chosen exemplary embodiment) are as identical as possible. As a minimum requirement, the paths of light must be so precise that the scanning paths will be monotonously ascending with the direction of movement of the measuring carriage.

The diameter of the polygonal unit is determined by a necessary aperture for the receiving lenses and the number of mirrors that are necessary for the desired scanning angle. The angle of the mirrors along the direction of rotation is assumed to be non-critical, since this will only cause a time displacement of the scan. This could be compensated for by the light passing said trigger diode 44 immediately prior to the start of the scan, and said trigger diode 49 immediately after the end of the double curved mirror 39 thereby registering the time of the end of the scan.

The angle of the mirror transverse to the direction of rotation must however deviate very little from mirror to mirror, and in the present embodiment of the invention this angle deviation must typically be <1 milliradian.

The angle of the mirrors will be adjustable, according to the invention, by means of an apparatus such as the one in FIGS. 11 and 12. The polygonal unit here is made in that the shaft 49 of the driving motor 41 and thus the stator of the motor is secured to a holder 50 for the polygonal mirror unit. The motor housing will thus be connected to the mirrors 40 which are a part of the unit 32, said motor housing rotating together with the mirrors 40.

The mirrors are deposited in a holder or rotor 51 which fixes the under side of the mirrors in a receiving angle or groove at two points 52 and 53. The upper side of the mirrors are supported at one point by a flexible metal plate 54. The plate 54 has, moreover, two punched-out tongues 55 and 56 which project from the centre of the metal plate 54 and come to bear against the back of the mirror in order to Dress the mirror out towards its abutment points uppermost and lowermost. A screw connection 57 causes said mirror bottom holder 51 and said flexible metal plate 54 to be held together. By tightening the screw connection 57, the metal plate 54 will be bent together, whereby the upper side of the mirror 40 will be drawn in the direction of the mid-point of the polygonal unit. If the screw is loosened, the mirror will move outwards as a result of the spring effect of said metal plate 54. The form of the metal plate makes it possible to obtain considerable exchange between the downwards bending of the plate and the position adjustment of the mirror. The polygonal mirror unit is connected to the laser distance measuring apparatus 13, which can be firmly fixed to the holder 50 in such a way that the polygonal unit and the laser distance measuring apparatus thereby have their position relative to one another fixed. By installing the distance measuring apparatus/polygonal unit in a bench, and turning the laser on, the mirrors 40 in the polygonal unit will be adjustable to the correct and possibly identical angles by manually rotating the polygonal unit 32 and observing the light path of the laser on a screen at a distance that is sufficient to make possible an accurate adjustment of the position of the paths of light.

A pin 58 is arranged on the polygonal unit which extends down from the polygonal unit and will interrupt a light beam when it passes a light fork. Said pin is used to identify the position of the polygon by communication with a computer so that the computer knows which of the mirrors is used in the scan at any point of time. Thus the computer will be able to include possible remaining errors in the mirror angles of the polygonal unit so that such errors can be included in the calibrating algorithms of the computer.

An ideal, fan-shaped scan is generated by a mirror which rotates around an axis which is placed in the centre of the mirror in the plane of the reflecting coating. However, it is only possible to achieve this by using one or two mirror surfaces (double-sided mirrors). In the present invention, the scan constitutes approx. 60°. If a double-sided mirror is used, only twice 30° of a 360°-rotation could be used which would give rise to poor efficiency in terms of time.

To make better use of the distance measuring apparatus, according to the preferred yet not limitative embodiment of the invention, six mirror surfaces are used which are assembled in a polygon, where the diameter of the polygon is determined by the size of each mirror. The mirror surfaces will, in this way, be displaced from the centre of rotation and this will give rise to a fan-shaped scan where the centre of rotation will, in reality, move during rotation. The consequence of this in the present case will be that the scanning beams which sweep over the object will not be parallel if a paraboloid is used as a double curved mirror. In the present invention, the form of this mirror is therefore modified in relation to a rotated parabola, so that the light will travel parallel down towards the object 1. This is done in practice by changing the radius value and also the position of the radius centre for the rotated parabola sufficiently along the mirror, the opposite of what will happen to the polygon after the polygon scans over the double curved mirror, whereby the error will be compensated.

FIG. 13 shows in more detail how the foot of the reflected beam moves along the mirror surface (and the position of the centre of the fan-shaped scan) as the mirror surface 40 rotates. At a first position 59 for the mirror unit 32 the distance between the foot point of the beam and the centre of the mirror unit is $d_3$. Furthermore, the angle between the incident beam 16 and the reflected beam 18 is equal to approx. 90°. When the polygonal unit 32 is at position 60 (which can be seen in FIG. 13) the reflection point or foot point of the incident beam 16 will have changed so that the distance from said centre will now have increased to $d_4$. The angle between the incident beam 16 and the exiting beam 18 is in this case β, e.g. 30°. Moving the centre 40' of the mirror surface 40 over the distance $d_2$ thus causes the foot point of the reflected beam to move over the distance $d_1=d_4-d_3$. It is precisely this last movement that is problematic.

It will thus be understood that the movement (sideways and in/out) of the centre of rotation must be compensated, and this happens in that the radius of curvature of the double curved mirror is varied along the length thereof.

As is made clear in FIG. 1, the measuring carriage 6 has a window 61. This window which comprises a glass plate is necessary in order to prevent a build up of dust inside the measuring apparatus 5, i.e. inside the carriage 6. A build up of dust could, to a great extent, affect the result of the measurement in an unfavourable direction and would moreover require constant cleaning. It is obvious that it would be simpler to clean only the surface of the window 61 on the outside of the carriage 6. As a result of dust and scratches, this window will be the greatest image for stray light. This window will represent the largest problem when it comes to shielding.

Figure 14:
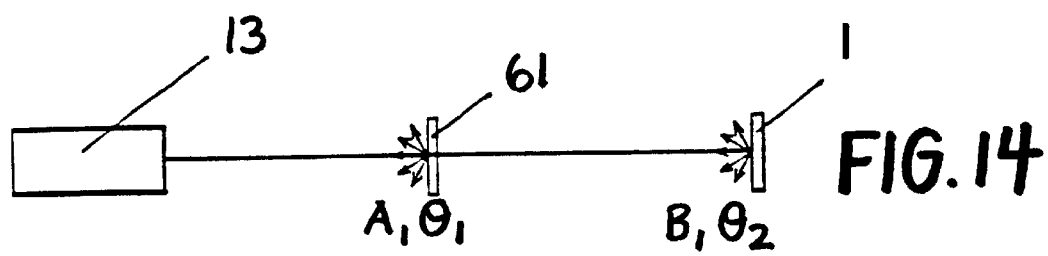
FIG. 14 illustrates the problems connected with stray light.
Figure 15:
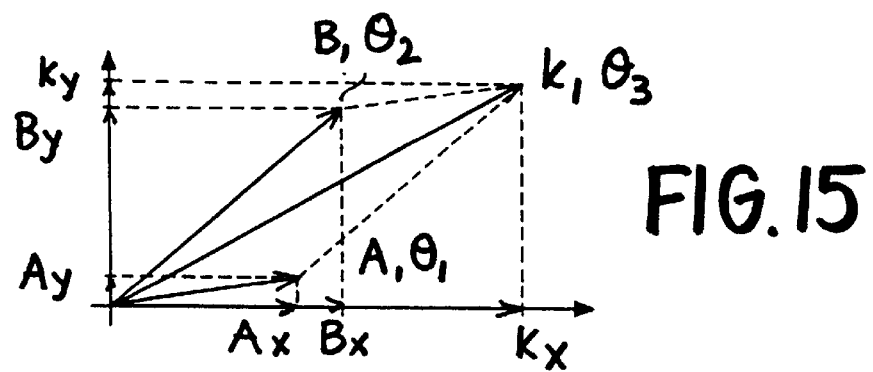
FIG. 15 discloses geometrical considerations connected to the problems of stray light.

However, when using a window glass plate of this kind, unwanted light reflexes may occur therefrom, so-called stray light. The problems associated with this will be explained in more detail in connection with FIGS. 14 and 15 and thereafter also in connection with FIGS. 16 to 19.

A laser distance measuring apparatus 13 measures distance by measuring phase difference between emitted and reflected light from the object 1. This phase difference will be influenced by optical devices, if any, such as said glass plate 61, through which the light passes on its way and which partially reflects light back to the light sensor in the laser distance measuring apparatus 13. A window surface 61 would typically reflect 1–4% of the light and 96–99% of the light would pass through the window surface, although dependent upon the material used in the window, coating thereof, if any, etc. If the window is positioned perpendicular to the beam direction, the reflection will be captured by the receiver and will modify the distance measurement in such a way as will be understood in more detail by looking at FIG. 15 together with the following mathematical expressions:

$$S = k \sin(2\pi ft + \theta_3) = A \sin(2\pi ft + \theta_1) + B \sin(2\pi ft + \theta_2)$$

$$Ax = A \sin(\theta_1), Ay = A \cos(\theta_1),$$

$$Bx = B \sin(\theta_2), By = B \cos(\theta_2)$$

$$kx = k \sin(\theta_3), ky = k \cos(\theta_3)$$

$$k = ((kx)^2 + (ky)^2)^{1/2}$$

$$\theta_3 = A \tan(kx/ky) = A \tan((A \sin(\theta_1) + B \sin(\theta_2))/(A \cos(\theta_1) + B \cos(\theta_2)))$$

One will see here that amplitude and phase displacement of the object to be measured is described as $B_1\theta_2$ and that the stray light from the window is denoted $A_1\theta_1$. The signal which is measured will thereby be made a vectorial sum of these two signals, viz., $k_1\theta_3$. If $\theta_1$ and $\theta_2$ have a phase difference of 90°, the error will have a maximum effect.

Whilst the emitted light typically would be in the range of 1 to 10 mW, the light reflected back from the object to be measured would typically be in the range 50 to 1000 nW. The stray light must typically be $<1/100$ of the retro-reflected light in order not to affect the accuracy of the measurements. This means that the stray light from the optical surfaces which is reflected back to the light sensor must be less than one millionth of the emitted light energy.

It is therefore essential to be able to detect both stray light and light which is received from the object being measured in order to be able to cancel the effect of the stray light source. The theory behind this will be understood in more detail by looking briefly at FIG. 19 and the explanation hereinbelow.

Light from the source of stray light is denoted $L_s$ and light from the object being measured is designated $L_m$. Furthermore, suppose that the light energy on the main detector is $L_H$ and on the stray light detector is $L_B$. The following is thus obtained:

$$L_H = k_1 * L_s + k_2 * L_m$$

$$L_B = k_3 * L_s + k_4 * L_m$$

wherein $k_1 << k_2$ and $k_3 >> k_4$

Now suppose that the electric response to these signals in the light sensors 62 and 63 is summed electrically in a summation circuit 64 so that:

$$L_{tot} = L_H - k * L_B$$

Prior to being applied to the summation circuit, the stray light signal passes a phase and amplifying adjustment circuit 65 which has an amplification factor k.

By setting the amplification factor $k = k_1/k_3$, $$L_{tot} = k_1 * L_3 + k_2 * L_m - k_1 * L_S - k_4 * k_1/k_3 * L_m$$

or since $k_1$, $k_4 << k_3$, it is obtained:

$$L_{tot} = k_2 * L_m$$

Figure 19:
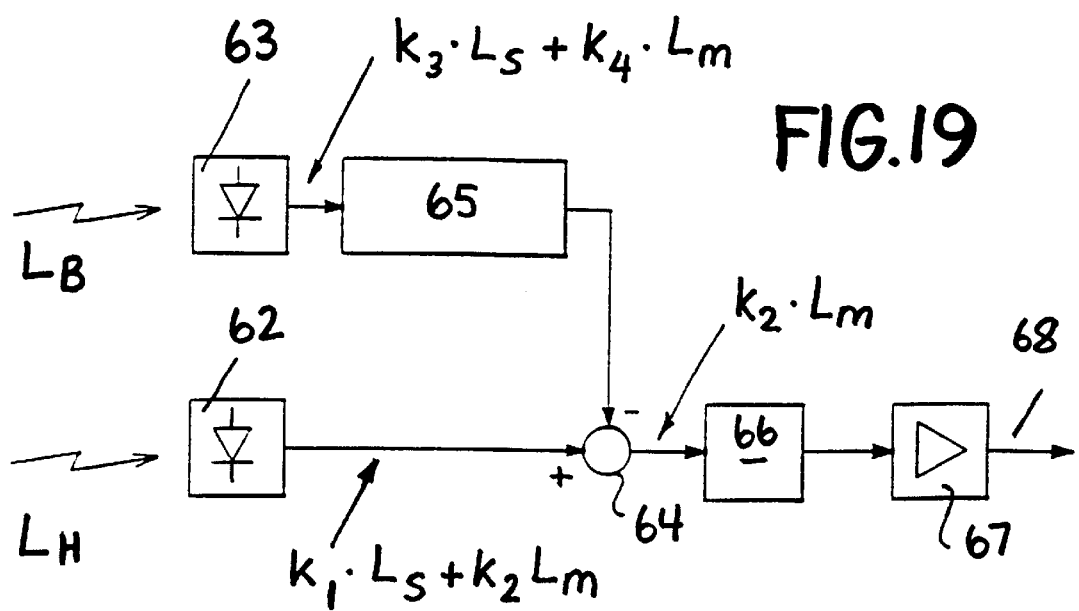
FIG. 19 shows a block diagram of a circuit for cancelling stray light.

In the electrical arrangement in FIG. 19 the signals are summed in that phase and amplification of the signal from the stray light detector are adjusted until the signal from a reflector (not shown), which is placed at a distance which corresponds to the outer source of stray light, provides zero signal from the circuit. The distance measuring apparatus will then be insensitive to stray light which is reflected at this distance.

Since the quantity of stray light on the stray light detector 63 is greater than on the main detector 62, only a small part of the signal in the stray light detector will be inter-mixed with the main signal. Noise from the stray light detector and its amplifier will therefore only to a small degree affect the signal - noise ratio of the main detector. The main detector consists of a tuned LC-circuit 66 which serves as a filter and an amplifier 67 which has a high signal - noise ratio. The signal at the output 68 will thus be representative for that light which is reflected from the object 1 and from the underlying support 3.

In order to be able to detect both main light and stray light, it is essential to be able to separate the two types or light optically.

Figure 16:
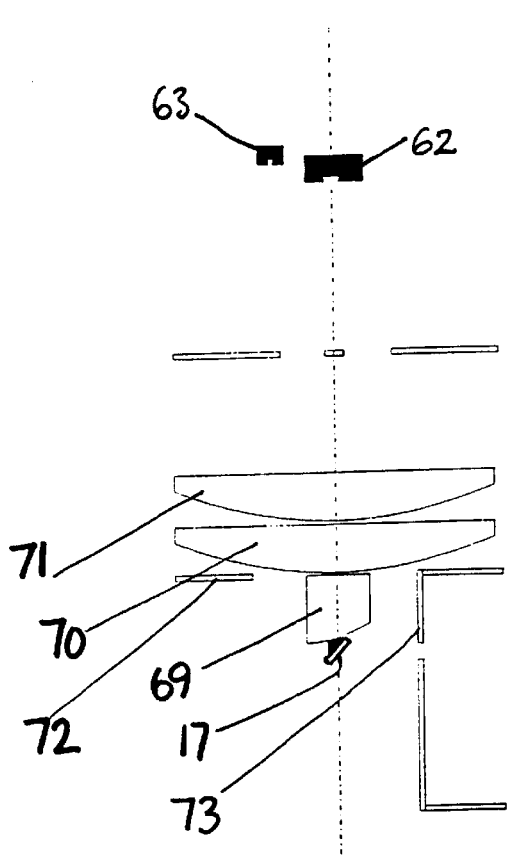
FIGS. 16 and 17 show a first embodiment of a stray light detector.

In FIG. 16 a so-called wedge lens 69 is shown which refracts the light in the central part of the receiving lens 70 to the side. The lens 71 is an additional lens and has no significance for the understanding of how the main light and the stray light are separated in the solution shown here. Shields 72 and 73 are provided in order to ensure that only light in the central parts of the lens area hits the detectors 62 and 63. By using the wedge lens C an optical shielding is achieved, but it is, as indicated above, not required that one shields sufficiently for one hundred percent elimination of stray light from the outermost source of stray light in the apparatus, namely the window 61 in the measuring carriage. The light sensor for the main light, also here denoted by the reference numeral 62, may be a PIN diode which is positioned at a focal distance which corresponds to the area of measurement, and will substantially receive light from the object being measured, and because of the wedge lens 69 receive a reduced part of stray light from the outermost source of stay light.

Figure 17:
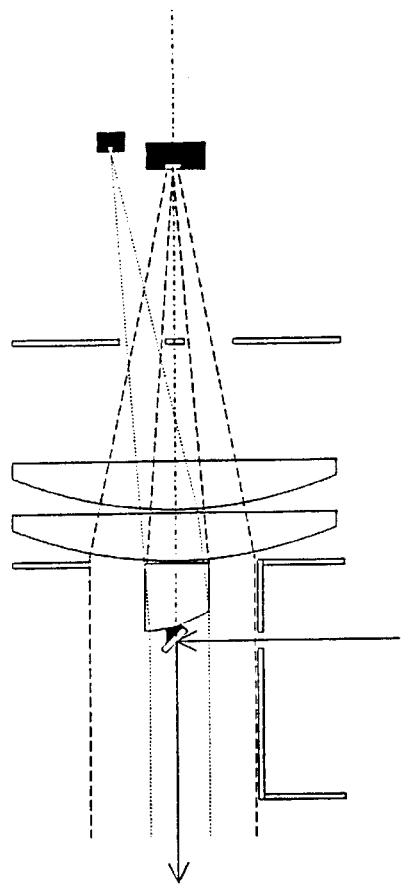

As will be seen in more detail from FIG. 17, the wedge lens 69 will refract light from the centre of the receiving lens 70, 71 out to the side of the main light detector 62 to the stray light sensor 63 which is positioned at a focal distance which corresponds to the outermost source of stray light, in this case the glass plate 61. This stray light sensor will, in the main, receive scattered light, and because of the focal distance, a reduced part of the main light.

Figure 18:
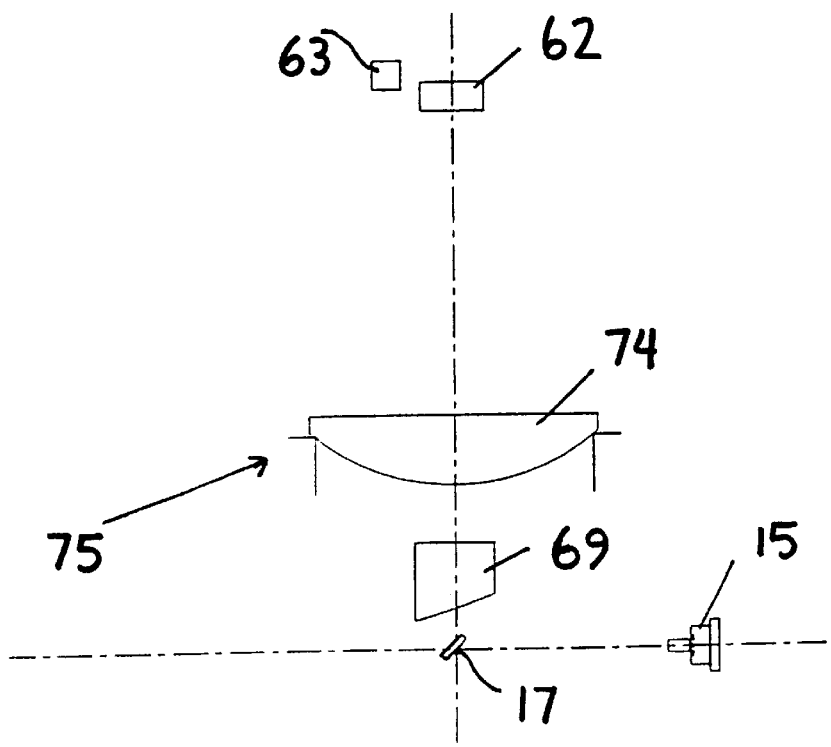
FIG. 18 shows a modification of the stray light detector in FIGS. 16 and 17.

In FIG. 18 a modification of the solution in FIGS. 16 and 17 is shown where a lens 74 is placed in connection with the shield 75 and where the wedge shaped lens 69 is placed at a distance from the lens 74, in contrast to the solution in FIGS. 16 and 17. Moreover, the mirror 17 which deflects the light beam from the light source 15 is also positioned at a distance from the wedge lens 69. The manner of operation of this solution which is illustrated in FIG. 18 will, however, correspond to that which has just been described in connection with FIGS. 16 and 17.

In connection with a measuring apparatus of the present type or other measuring apparatus where accurate positioning of the emitted laser beam is required, it is essential that the focusing and adjustment of a diode laser can be carried out in a simple, yet accurate manner.

In this connection closer reference shall be made to FIGS. 20 and 21. It is expedient to equip a laser diode 76 with a fibre lens 77 for collimating the laser light. The fibre lens can be of the "Selfoc" kind. The positioning of this lens is important for achieving a good quality of the laser spot which is reproduced on the object being measured. Both sideways position, orientation and distance in relation to the diode laser 76 are important, and typically a positioning must be carried out with a precision which is better than 50 $\mu$m. For this purpose, according to the invention, a fine positioning of the fibre lens 77 is proposed in order to finely adjust the direction of the emitted laser light, which entails a further requirement of accurate positioning of the lens 77, typically with an accuracy equal to 1 $\mu$m.

To be able to adjust focus, the distance between the fibre lens 77 and the laser diode 76 must be finely adjusted. The fibre lens 76 is put in a V-shaped groove 78 and is held in place by a spring 79. The lens 77 is outermost on an arm 80 which is resilient about a centre of rotation 81 which is so far away that the lens can be said to be displaced parallel to and from the laser. A screw 82 is fixed in the arm 80 and is drawn back and forth by a nut 83 against the tension effect of an O-ring 84. The focus of the laser will thus be adjusted by turning the nut 83.

To obtain side positioning of the lens in relation to the laser diode, the retainer plate 80 for the lens 77 will be solidly secured in a retainer plate 85 by means of two screws 86 and 87. The retainer plate 85 is provided with two slots 88 and 89 which form arms 90, 91 and 92. The arms 90 and 91 are interconnected at point 93 and the arms 91 and 92 are connected at point 94. The lens 77 is attached to the arm 92 via the retainer plate 80 and the screw connection 86, 87.

By adjusting a screw 95, the arm 92 will rotate elastically around the point of rotation 94. By adjusting a screw 96, the arm 90, and also the arm 92, will rotate elastically around the point 93. These adjustment screws 95 and 96 will thus displace the lens 77 sideways relative to the laser 76 along two paths of rotation which are at 90° to one another. One thus achieves independent sideways adjustment along the two axial directions. Owing to the difference in distance from the points of rotation to the lens and to the screws, a considerable exchange factor is achieved which makes possible the fine positioning of the lens.

In order for the emitted laser light to coincide exactly with the optical axis of the receiving optical means, the side position of the fibre lens will be finely adjusted until maximum light signal from an object to be measured is received on the receiver diode 62. By using a shield 73, as is shown in FIG. 16, stray light will be prevented from being scattered inside the distance measurement housing and from being able to reach the receiving diode. Possibly, the shield 73 can be replaced by a tube (not shown) the axis of which coincides with the lens 77.

Figure 23:
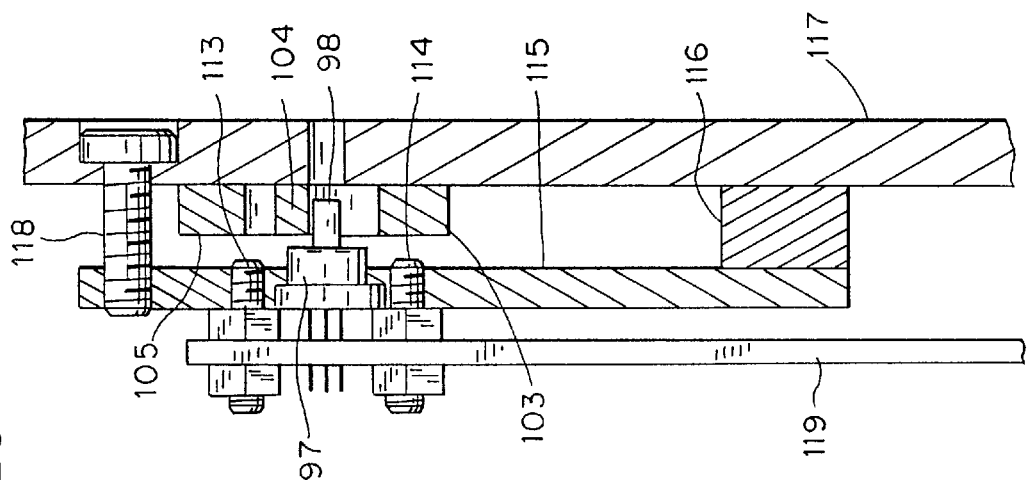
FIG. 23 shows the section XXIII—XXIII in FIG. 22.
Figure 22:
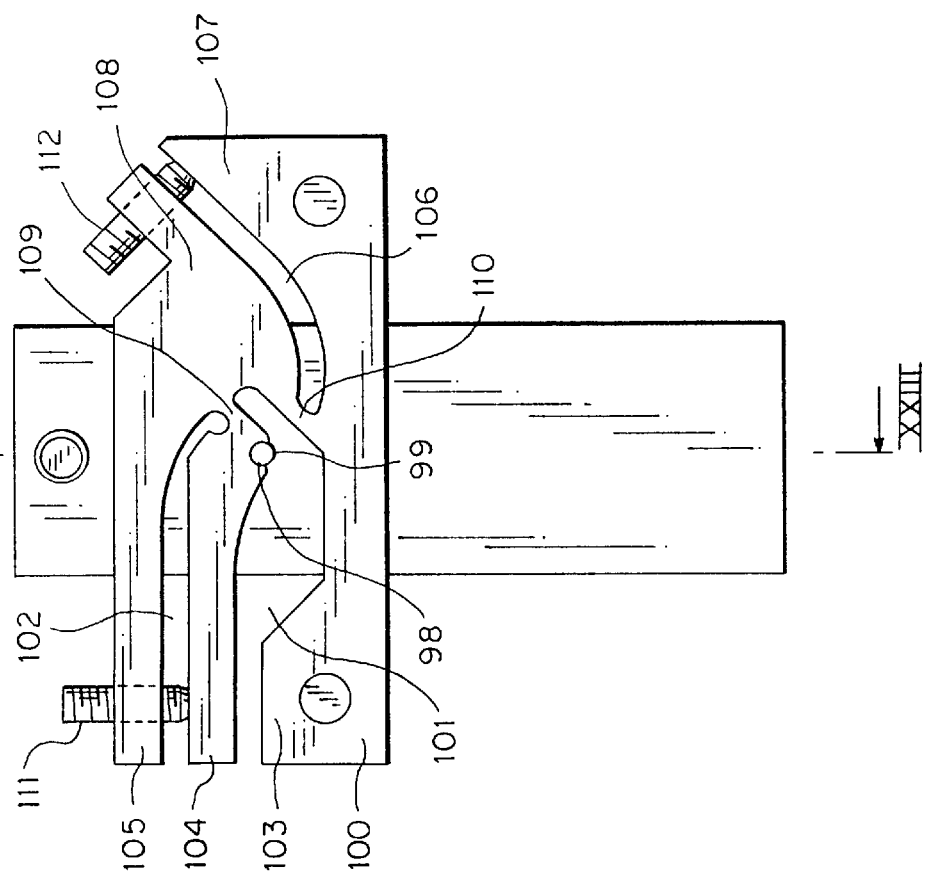
FIG. 22 shows in front view a modification of the apparatus in FIGS. 20 and 21.

A variant of the adjustment apparatus which is shown in FIGS. 20 and 21 can be seen in the attached FIGS. 22 and 23.

To adjust the focus of the laser diode 97, the distance between the fibre lens 98 and the laser diode must be finely adjusted. The fibre lens 98 is put in an almost V-shaped groove 99 and is secured with a UV-curable glue or similar adhesive. The lens 98 is in a retaining plate 100 which is designed to have two slots 101 and 102 which form arms 103, 104 and 105. Furthermore, in retainer plate 100 an additional slot 106 is arranged causing the formation of two additional arms 107 and 108. The arms 103 and 107 are rigidly connected to one another and the arms 105 and 108 are also rigidly connected to one another. The arms 104 and 105 are connected to one another at a point of rotation 109 and the set of arms 105, 108 are rotatably connected to the set of arms 100, 107 via a rotational connection 110. As can be seen from FIG. 22, the lens 99 is fixed to the arm 104 close to the point of rotation 109.

By adjusting a screw 111, the arm 104 will rotate elastically about the point of rotation 109. By adjusting a screw 112, the arm 105, and similarly the arm 104, will rotate elastically about the point of rotation 110. These adjustment screws will displace the lens sideways relative to the laser 97 along two paths of rotation which are at 90° to one another. One thus achieves independent sideways adjustment along two axial directions. Because of the difference in distance from the points of rotation to the lens and to the screws, a considerable exchange factor is achieved which enables the lens to be finely positioned. The laser diode 97 is mounted by means of screw connections having retainer discs 113 and 114 in an arm 115 which via a stay 116 is secured to a frame 117. The stay or spacer 116 can optionally be unitary with the arm 115 and the frame component 117, eg, made as an extruded profile, or the arm 115, the stay 116 and the frame component 117 can be made as separate parts which are fastened together by means of a screw connection or by gluing. Adjustment of the focus between the laser diode 97 and the fibre lens 98, i.e. the relative distance between the two elements, will be carried out by means of a screw 118 which extends between the frame component 117 and the arm 115. Bending of the arm 115 will take place near the stay or spacer 116, and because of the short distance of movement of the laser diode 97 relative to the fibre lens 98, seen in relation to the length of the arm 115, the movement between the two elements 97 and 98 will be almost parallel.

The arm 115 is attached, via the screw connections 113 and 114, to a circuit board 119 which is used, for instance, for the electronics involved in controlling the laser diode 97. However, it will be understood that the circuit board 119 has no significance for the appreciation of the adjustment possibilities for the fibre lens 98 and the laser diode 97.

Figure 24:
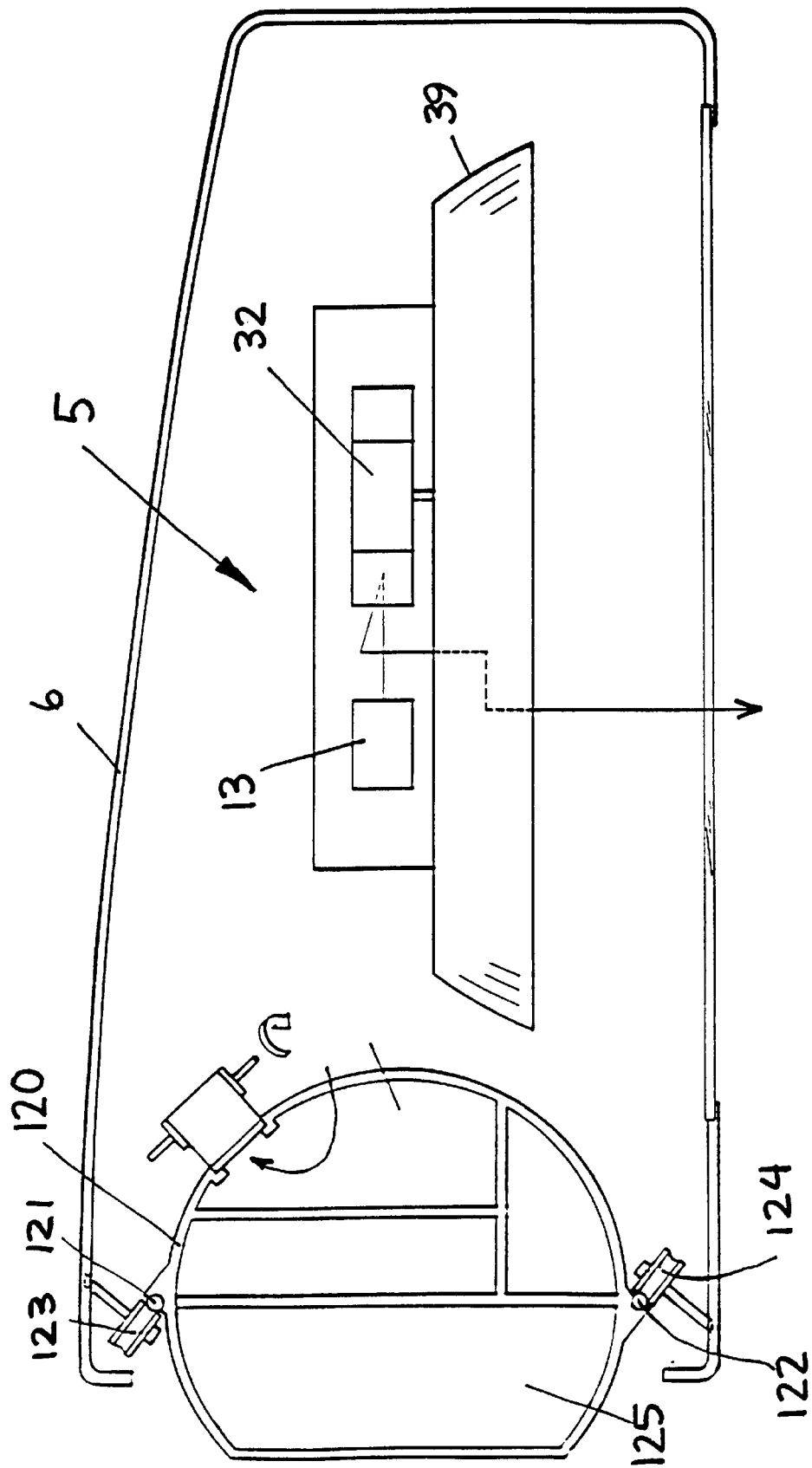
FIG. 24 shows the measuring apparatus according to the invention placed in a carriage that can be moved back and forth.

The measuring apparatus, which is described, inter alia, in connection with FIGS. 6 to 9, can also be seen in FIG. 24.

Figure 25:
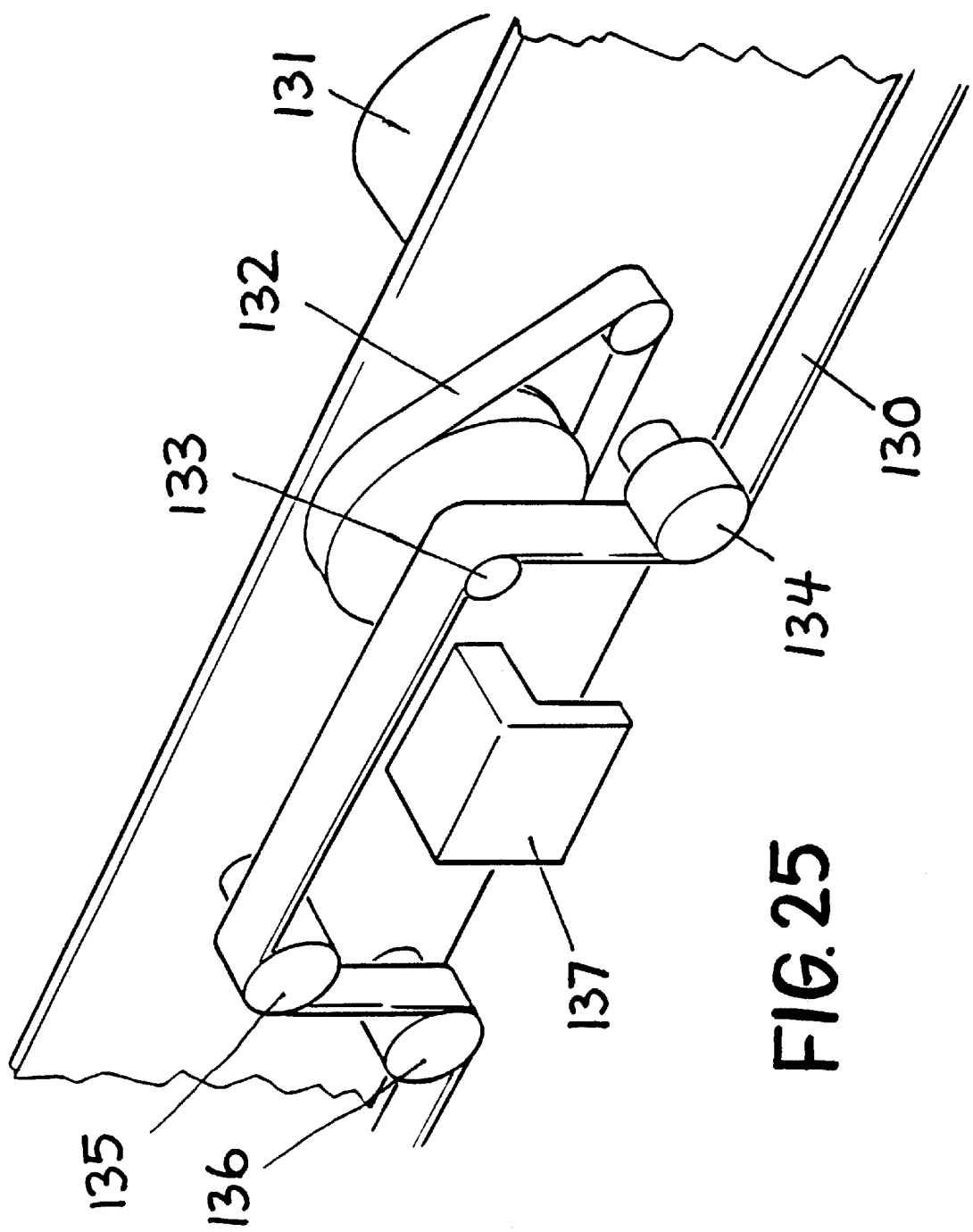
FIG. 25 show a detail of the carriage in FIG. 24 for the moving thereof and asspcoated cabling.

The measuring apparatus 5 with its carriage 6 is mounted on an aluminium profile 120 which has two grooves where, by means of cold welding, two steel rails are placed, one rail 121 on the upper side and a second rail 122 on the bottom side. Three casters provided with ball bearings, of which only two casters 123 and 124 are shown, slide along these steel rails 121 and 122 and carry the carriage 6. Inside the aluminium profile there are two cavities, the rear one 125 of which having space for coupling terminals, transformers and similar. The ends of the profile are covered with end closures 126 and 127 (see FIG. 1) and there there are attachments for fixing the profile to ceiling, wall or on a floor stand. In a front cavity 128 there runs a cable chain in which power and signal cables lie. The cable exits via a slot 129 in the profile 120. Said slot 129 is covered by a toothed belt 130 (see FIG. 25). The toothed belt is fixedly attached at either end of the profile body 120. Said toothed belt 130 is lifted away from the slot 129 as the carriage moves by means of a mechanism which is in the carriage and which is shown in FIG. 25. A motor 131 in the measuring carriage 6 draws the measuring carriage back and forth along the profile 120 (see also the reference numeral 7 in FIG. 1) via an exchange 132 and a gear 133. The gear 133 engages with the toothed belt 130, and the toothed belt is guided over guiding casters 134, 135 and 136. A holder 137 projects into the profile 120 in the cavity 128 and guides the cables into the cable chain and draws the end of the cable chain with it.

By means of the present invention, a total measuring system is thus described wherein a special feature is the design of the double curved mirror, whereby this is given a focusing power which enables the lens system to be moved effectively much closer to the object which is to be measured. The solid angle with which one can observe the laser soot will increase, for a given area, inversely proportional to the square of the distance. It is therefore essential to make the distance that the laser beams move as short as possible and thereby achieve the best possible accuracy of measurement. Furthermore, the necessary dimension is reduced for the subsequent components which are positioned after the first focusing mirror, especially folding mirror, polygonal mirror and lenses which are mounted right in front of the sensor unit.

Even though the invention here has be illustrated and described with reference to preferred embodiment examples, it will immediately be understood that modifications can be made within the frame of the patent claims which follow without thereby deviating from the inventive idea.

Technical equivalents of this kind are thus considered to lie within the scope of protection of the patent claims hereinbelow.

What is claimed is:

1. An apparatus for deflecting a light beam by means of a rotatable polygonal mirror unit, wherein each mirror of said unit is individually adjustable, and wherein each mirror along a first edge thereof is mounted in a respective receiving groove on a rotor means of said unit, said groove having its axis located transverse to the axis of rotation of said rotor means, and each said mirror along a second edge thereof parallel to said first edge is adjustably attached to said rotor means by means of a spring element.

2. The apparatus according to claim 1, wherein said spring element is a metal plate having a first portion extending over said second edge and engaging a front face of said mirror and a second portion in the form of two punched-out tongues having the free ends thereof bearing against a rear face portion of said mirror.

3. The apparatus according to claim 1, wherein said spring element is adjustable by means of screw/nut connection which is attached to said rotor means at one end and at the other end engages said spring element, said spring element having its bending curvature changed upon adjustment of said screw/nut connection to cause said mirror to be moved correspondingly in a direction towards or away from a mid point of said polygonal mirror unit.

4. The apparatus according to claim 3, wherein said spring element is a metal plate having a first portion extending over said second edge and engaging a front face of said mirror and a second portion in the form of two punched-out tongues having the free ends thereof bearing against a rear face portion of said mirror.

* * * * *